Figure 1:
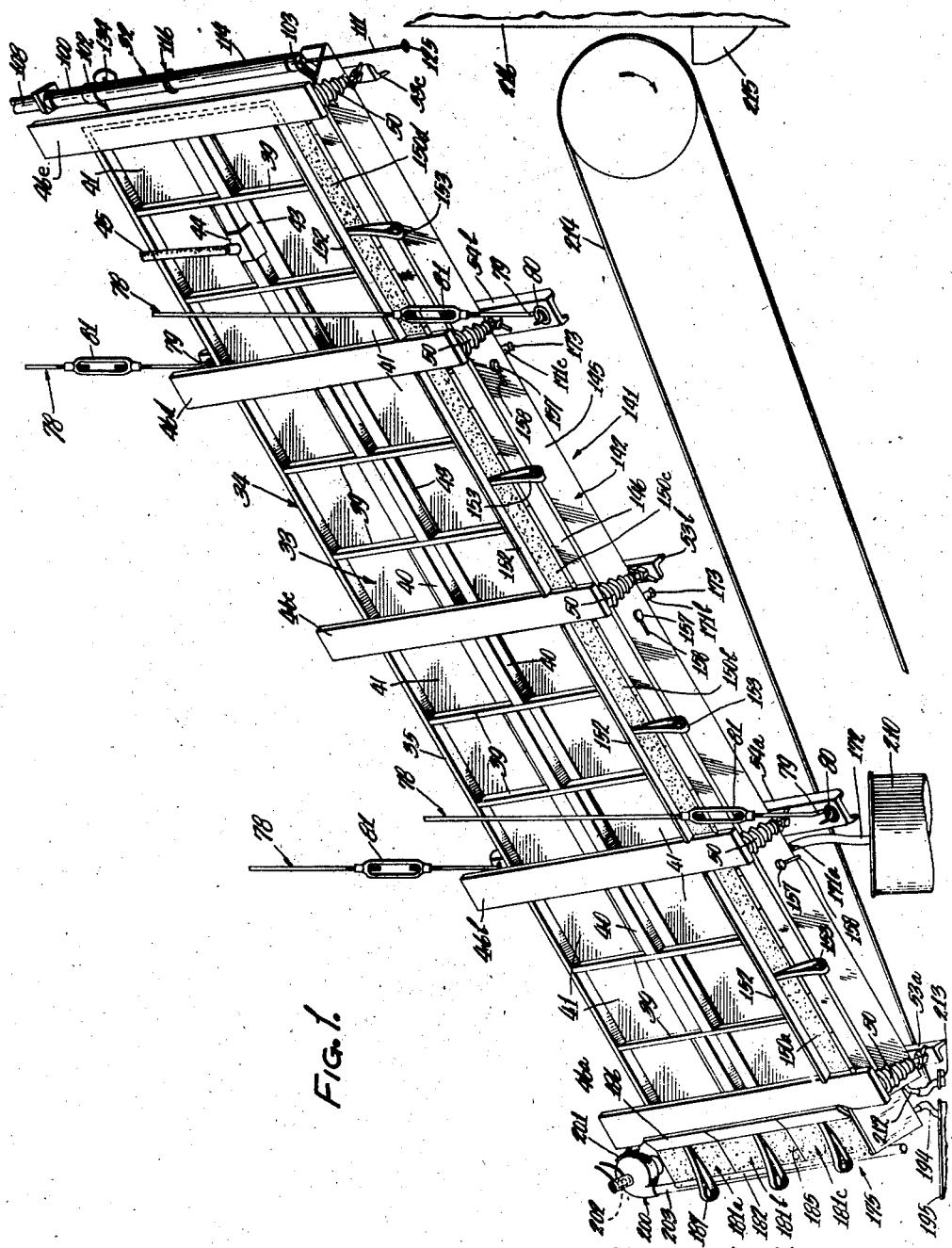

Jan. 28, 1947.  E. L. WIEGAND  2,414,993
APPARATUS FOR ELECTROSTATIC SEPARATION OF MATERIAL PARTICLES
Filed Jan. 3, 1942  7 Sheets-Sheet 1

EDWIN L. WIEGAND
INVENTOR

BY
ATTORNEYS

Jan. 28, 1947.　　　　E. L. WIEGAND　　　　2,414,993
APPARATUS FOR ELECTROSTATIC SEPARATION OF MATERIAL PARTICLES
Filed Jan. 3, 1942　　　7 Sheets-Sheet 2

EDWIN L. WIEGAND
INVENTOR
BY
ATTORNEYS

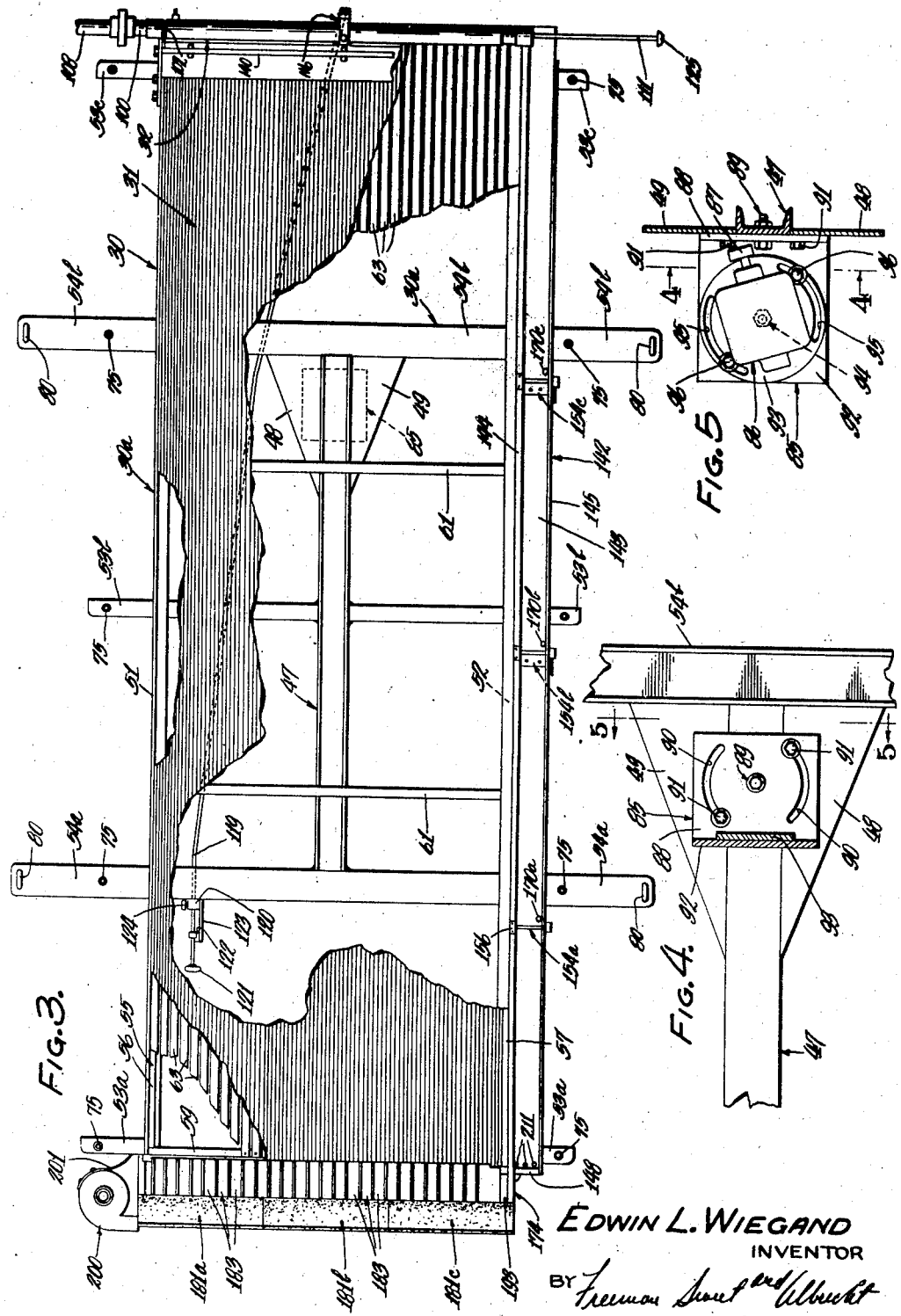

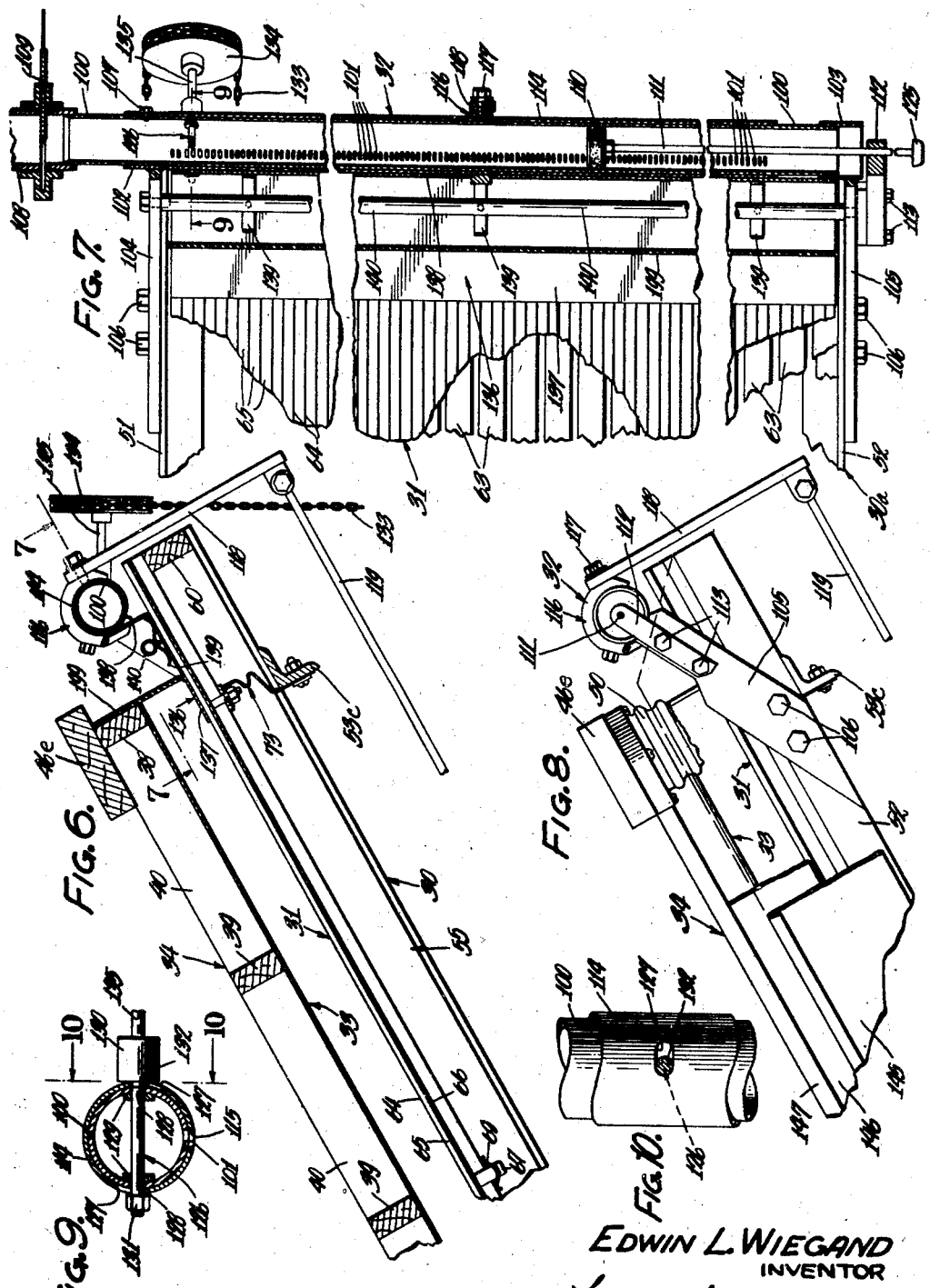

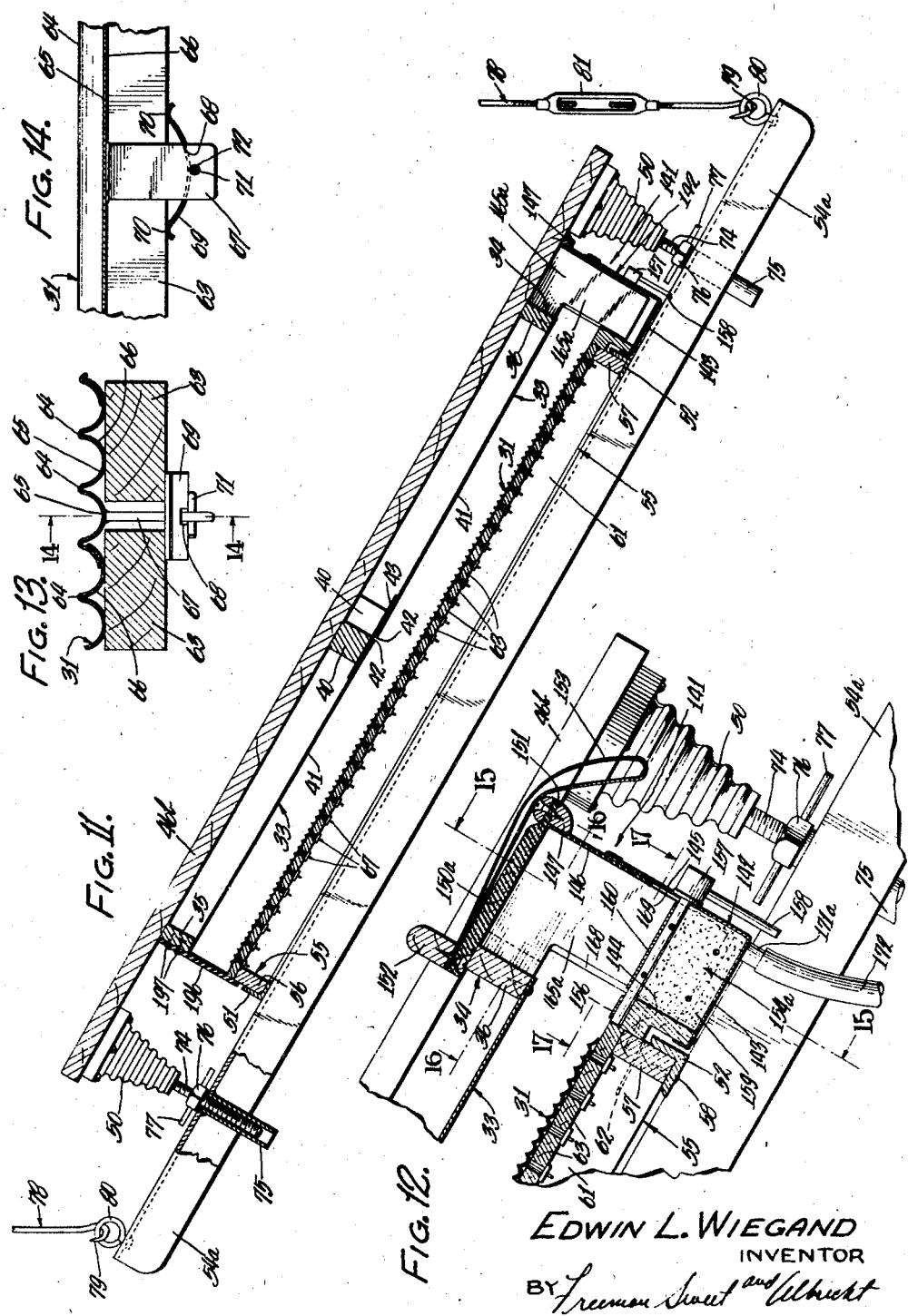

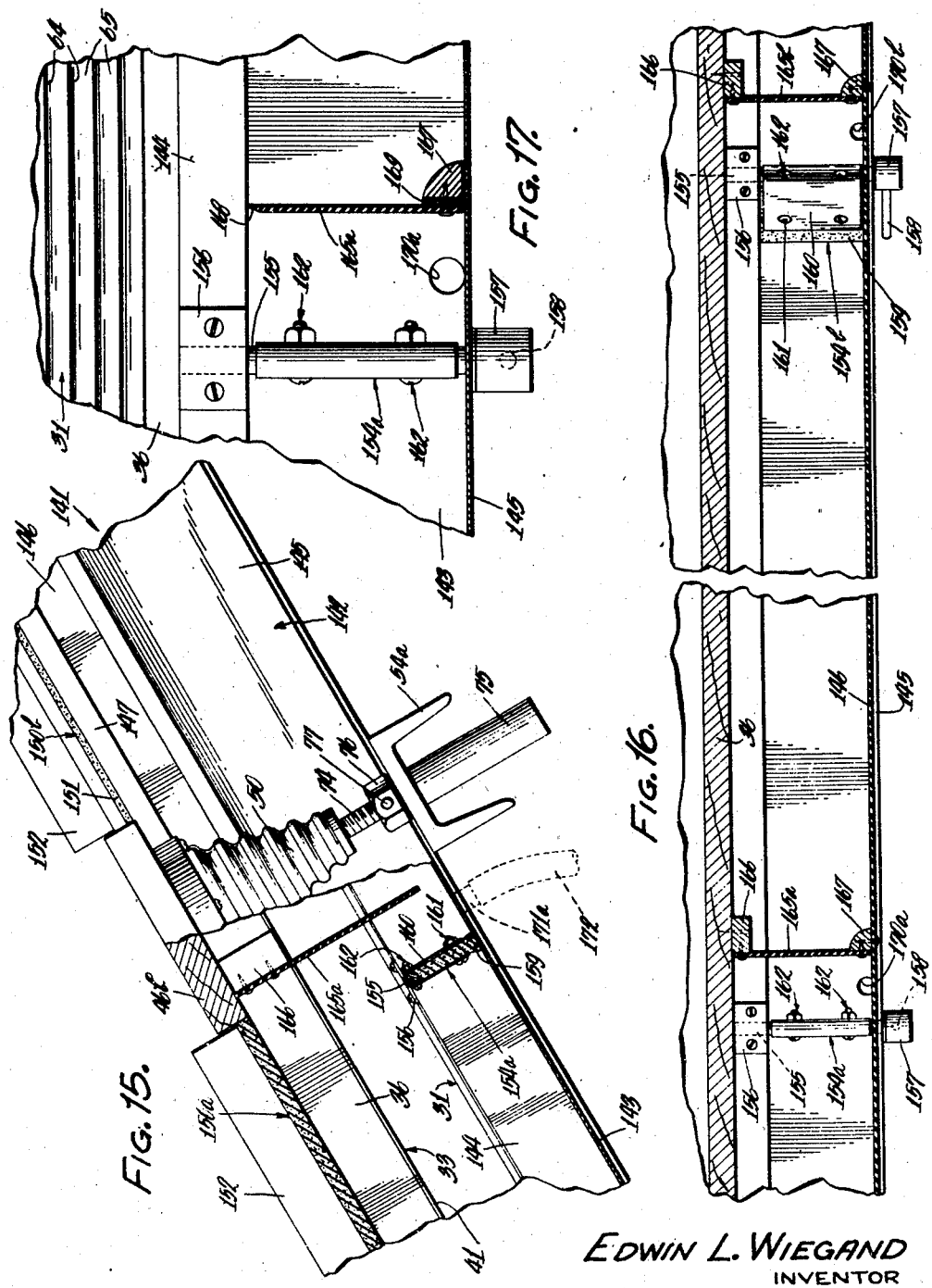

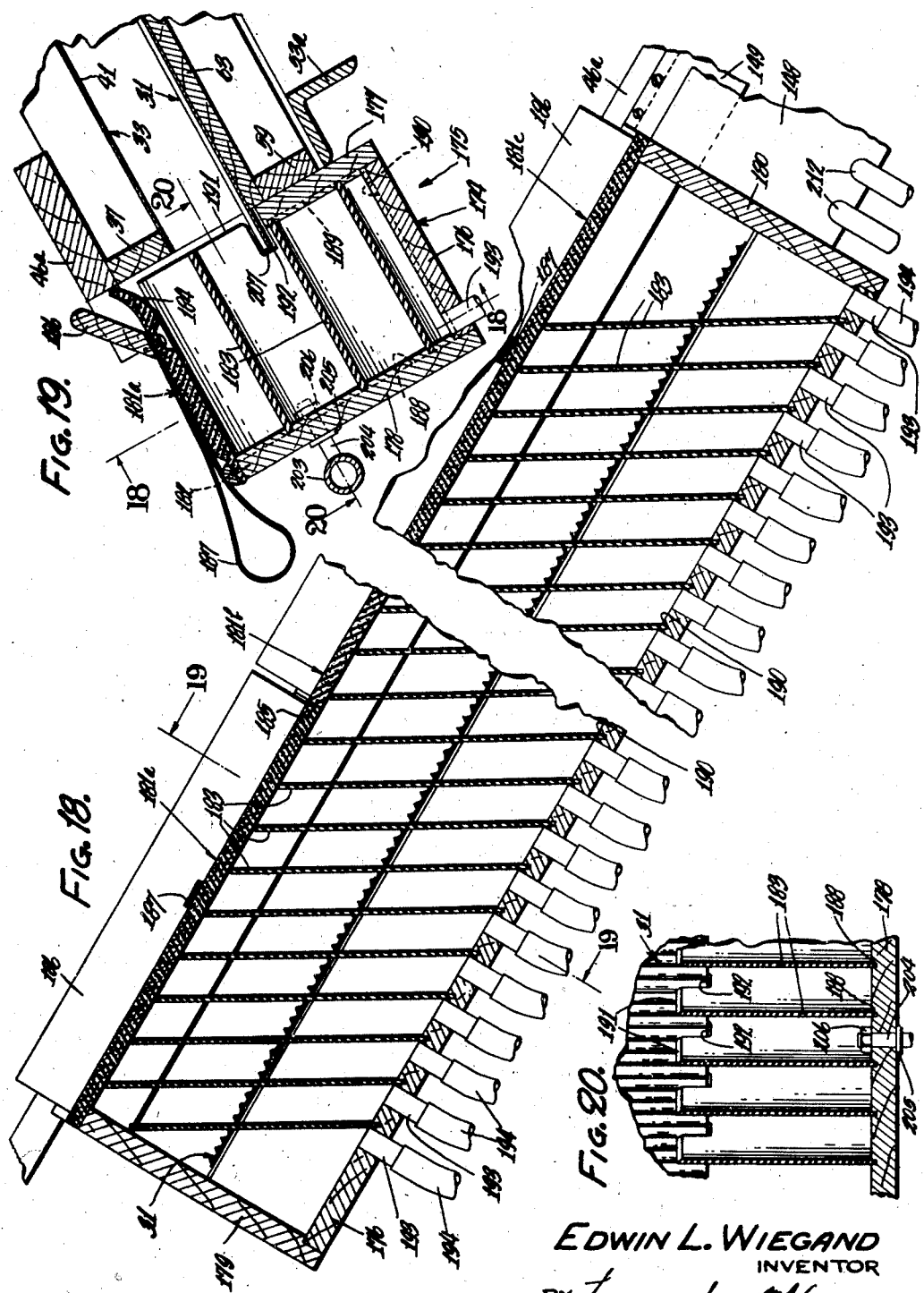

Patented Jan. 28, 1947

2,414,993

UNITED STATES PATENT OFFICE 2,414,993

APPARATUS FOR ELECTROSTATIC SEPARATION OF MATERIAL PARTICLES

Edwin L. Wiegand, Pittsburgh, Pa., assignor to Orefraction Incorporated, Pittsburgh, Pa., a corporation of Pennsylvania Application January 3, 1942, Serial No. 425,538

21 Claims. (Cl. 209—131)

My invention relates to electrostatic separation of material particles, and the principal object of my invention is to provide new and improved apparatus for a separation of this type.

Figure 2:
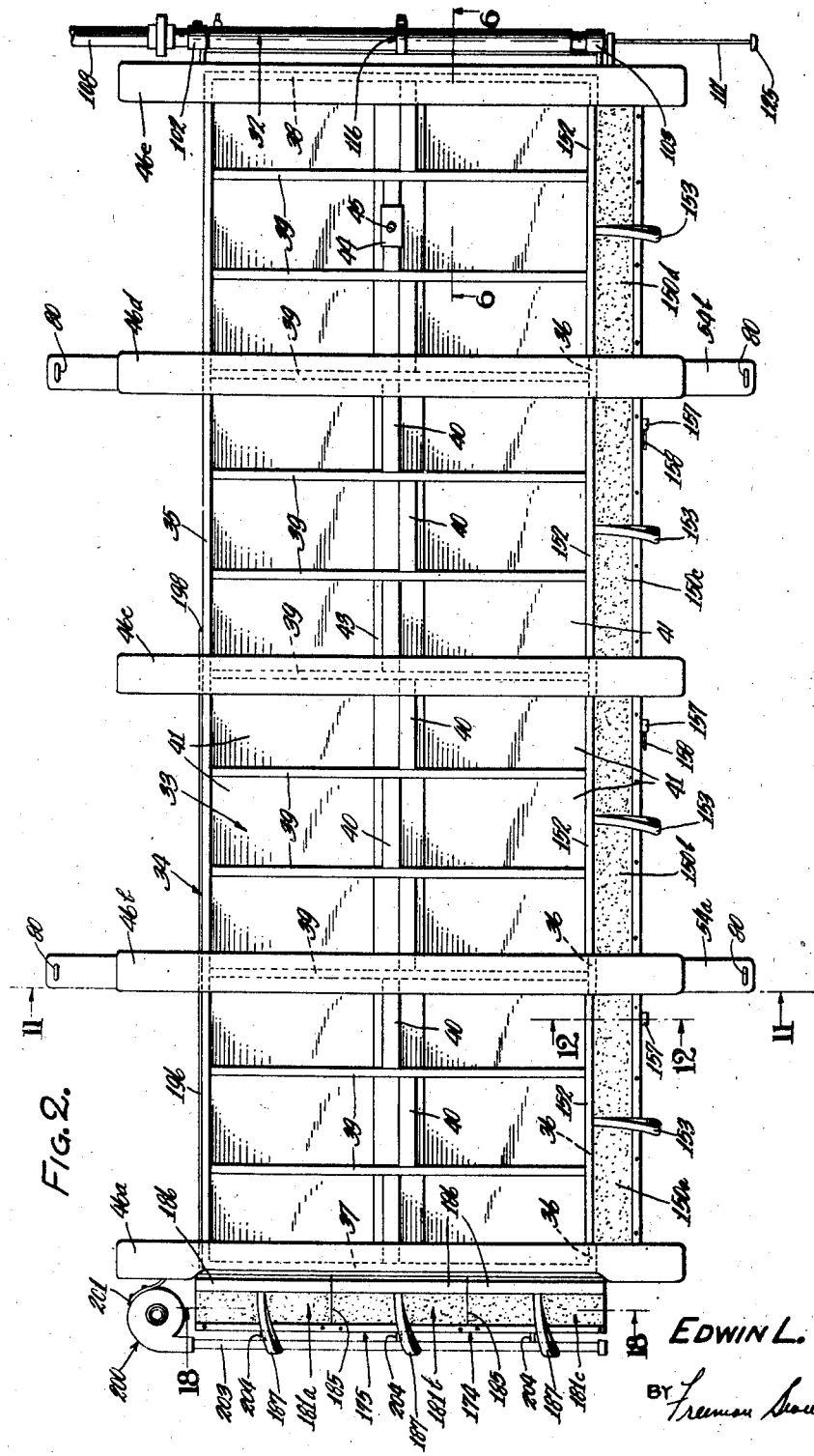

In the drawings accompanying this specification, and forming a part of this application, I have shown, for purposes of illustration one form which my invention may assume, and in these drawings:

Figure 1 is a side elevation of apparatus embodying my invention,

Figure 2 is a top view of the apparatus shown in Figure 1, looking in a direction normal to the general plane of the apparatus, Figure 3 is a view similar to Figure 2 but with the upper electrode of the apparatus removed and parts of the particle support or table being broken away, Figure 4 is a fragmentary view of a detail, looking toward the under side of the table of the apparatus, the view being a section on the line 4—4 of Figure 5, Figure 5 is a sectional view on the line 5—5 of Figure 4, Figure 6 is a fragmentary sectional view taken on the line 6—6 of Figure 2, Figure 7 is a fragmentary sectional view taken on the line 7—7 of Figure 6, parts being broken away, Figure 8 is a fragmentary side elevational view of the lower side of the feed end of the apparatus, parts being broken away, Figure 9 is a fragmentary sectional view taken on the line 9—9 of Figure 7, Figure 10 is a fragmentary sectional view taken on the line 10—10 of Figure 9, Figure 11 is a sectional view taken on the line 11—11 of Figure 2, Figure 12 is an enlarged fragmentary sectional view taken on the line 12—12 of Figure 2, Figure 13 is a fragmentary transverse sectional view of a detail of the table, Figure 14 is a fragmentary sectional view taken on the line 14—14 of Figure 13, Figure 15 is a fragmentary side elevational view partly in section taken on the line 15—15 of Figure 12, Figure 16 is a fragmentary sectional view taken on the line 16—16 of Figure 12, Figure 17 is an enlarged fragmentary sectional view taken on the line 17—17 of Figure 12, Figure 18 is a broken sectional view on an enlarged scale, taken on the line 18—18 of Figure 2, or the line 18—18 of Figure 19, Figure 19 is a fragmentary sectional view taken on the line 19—19 of Figure 18, and Figure 20 is a fragmentary sectional view taken on the line 20—20 of Figure 19.

Referring first to Figure 3, the apparatus herein illustrated includes a particle support or table 30 onto the surface 31 of which the particles to be separated are fed by a feeding means 32.

Mounted collateral to the table 30, in spaced relation with and above the table surface 31, is an electrode 33, hereinafter termed the upper electrode, supported by a supporting structure or frame 34. The frame 34 is of wood or other suitable insulating material and comprises longitudinally extending side bars 35, 36 and transverse end bars 37, 38, and longitudinally spaced cross-bars 39 between which extend longitudinal braces 40, all these parts being suitably fastened together to form a desirably rigid frame.

The upper electrode 33 may be in the form of a single metal plate covering the entire lower side of the frame or, desirably, it may be in the form of a plurality of panels or sections of sheet metal 41 each covering one or more of the openings in the frame 34. If the upper electrode 33 is made in sections, margins 42 of adjacent sections 41 are desirably flush with each other to define a flat surface. The margins 42 may leave a slight space between them as indicated in Figure 11, to allow for expansion due to heat.

Held between the frame 34 and the upper electrode 33 is here shown a metal electrical feed strip 43 to which is electrically connected a connector 44 and conductor 45, so that the entire upper electrode when made in sections may be conductively connected, by the single conductor 45, to a terminal (not shown) of a source of high potential preferably unidirectional. Ordinarily, the conductor 45 will be connected to the positive terminal of the source.

The upper electrode supporting frame 34 is supported from the table 30 by a plurality of longitudinally spaced cross-bars or cross-boards 46 (a, b, c, d, and e) these boards extending at each end beyond the respective side bars 35, 36 and being fastened to the frame 34 in any suitable manner; and each end of each cross-board 46 (a to e) is supported by an insulator 50 in turn supported by the table 30 as will appear.

The table 30 includes a metal frame 30a, best seen in plan in Figure 3, which comprises longitudinally extending side bars 51, 52, here in the form of angle bars (see for example, Figures 11 and 12), which are suitably fastened to the upper sides of a plurality of cross-bars 53a, 54a, 53b, 54b, 53c, longitudinally spaced to correspond with the spacing of the cross-boards 46 (a to e) of the upper electrode support. As here shown the cross-bars 53a, 53c at the ends of the table and the cross-bar 53b at the middle of the table are in the form of angle bars, while the cross-bars 54a, 54b disposed respectively between the bars 53a, 53b, and the bars 53b, 53c are in the form of channel bars. At each end of the angle bars 53a, 53b, 53c extend beyond the respective side bars 51, 52 about the same amount that the cross-boards 46 (a to e) extend beyond the side bars 35, 36 of the upper electrode support. The channel bars 54a, 54b extend a greater amount for a purpose which will appear.

As here shown the cross-bar 53b is made in two pieces the inner ends of which are welded to a longitudinally extending brace 47 of channel shape. The ends of the brace 47 are welded to the channel bars 54a, 54b. Brace plates 48, 49 may be welded to opposite sides of the channel 47 and to the cross channel 54b.

The table 30 further includes a frame 55 of wood or other suitable material comprising side bars 56, 57 disposed in the angle bars 51, 52 respectively and fastened thereto by screws 58 or in any suitable way; the frame 55 further comprising end bars 59, 60 and a plurality of longitudinally spaced cross-bars 61 suitably fastened to the side bars 56, 57 as by nails 62 or otherwise.

As may be seen most clearly in Figures 11, 13, and 14, fastened to the top of the frame 55 are a plurality of bars or slats 63 each extending from the end bar 59 of the frame to the other end bar 60 thereof, these slats being spaced laterally. The particle supporting surface 31 of the table is in this instance provided by sheet metal supported by the slats 63, and the surface 31 has collateral ribs 64 extending longitudinally of the table, so that the surface 31 comprises a plurality of alternate grooves 65 and ribs 64. These grooves 65 and ribs 64 are in the illustrated instance shown as provided by corrugated sheet metal 66, the corrugations being such that the grooves are substantially semi-circular in section, but this is not essential. Desirably the corrugated sheet metal 66 is provided in a plurality of laterally adjacent sections as best seen in Figure 13, and each section may extend the full length of the frame 55. The adjacent marginal portions of the sections are here shown as so constructed and arranged that those marginal portions overlap.

The corrugated sheet metal 66 which provides the surface 31 of the table is resiliently held in tight engagement with the slats 63, and the relative construction and arrangement of the slats and the holding means is such that the sheet metal is free to expand and contract, due to temperature changes, relatively to the slats, whereby warping is prevented and the desired uniform surface of the table is maintained. To this end, in the illustrated instance, the corrugated sheet metal 66 has welded thereto, to the underside of a given groove portion 65 a plurality of longitudinal spaced tongues 67 passing freely through the slot left between adjacent slats 63, and each tongue 67 passes through a slot 68 in a leaf spring 69 having rounded ends 70 both of which are adapted to bear against both adjacent slats 63. Each spring 69 is held in place, in flexed condition, by a cotter pin 71 through a hole 72 in the tongue 67. As here illustrated (Figure 11) one groove portion 65 of each section of corrugated sheet metal is in alinement with the slot between adjacent slats 63 and has a plurality of tongues 67 welded thereto the tongues each cooperating with a spring 69, as hereinbefore described, but the number of such fastening means may be more or less and will depend on the construction and arrangement of corrugated metal and on the number necessary to effect the desired result of maintaining uniform the general surface 31 of the particle support.

The particle supporting surface 31, being provided by sheet metal in this instance, itself serves as the lower or negative electrode of the apparatus, and hence the surface 31 will be referred to hereinafter as the lower electrode. The sheet metal 66 is grounded to the metal frame 30a of the table by connecting means 73 electrically connected in any suitable way to the sheet metal 66 and to a portion of the metal frame 30a, as the angle bars 53c (see Figure 6).

To the under sides of the ends of each cross-board 46 (a to e) of the upper electrode support 34 are fastened the insulators 50 into the lower ends of which are fastened threaded rods 74 (see particularly Figure 11) extending freely into guides or tubes 75 welded into holes in the cross-bars 53 (a, b, and c), and 54 (a and b) of the metal frame 30a of the table. The amount that the rods 74 extend into the guide tubes 75 is adjustable by means of nuts 76 on the rods 74, the nuts bearing against the upper ends of the respective guide tubes 75. Thus, the upper electrode supporting structure comprising the frame 34, the electrode 33 itself, and parts, hereinafter described, carried by the upper electrode support, are supported by the table frame 30a. The nuts 76 are provided with pins 77 for conveniently turning them manually. It is evident that by turning the nuts 76 the position of the upper electrode 33 with respect to the lower electrode 31 may be adjusted. Also, the entire upper electrode structure may be lifted away from the table, without disturbing the adjustment.

The apparatus is preferably, but not necessarily, supported so that it may be vibrated. To this end the apparatus may be suspended from a ceiling (not shown) or otherwise suitably supported. As shown in Figure 1, the apparatus is suspended by four rods 78 having hooks 79 engaging eyes 80 fastened to the ends of the channel bars 54a, 54b. Turnbuckles 81 may be interposed in each rod 78 for adjusting the effective length of the rods and hence the angle the apparatus assumes.

In Figure 1 the table 30 of the apparatus, and hence also the lower electrode 31, is inclined both longitudinally and transversely. The longitudinal inclination shown is 30° to the horizontal, as also indicated in Figure 6, and the transverse inclination shown is 30°, as also indicated in Figure 11. A suitable average inclination for both the longitudinal and transverse inclinations is about 37°. However, the longitudinal and transverse inclinations need not be the same amount. I have found that effective inclinations are in a range from about 27° to 45° for the longitudinal inclination, and in a range from 30° to 45° for the transverse inclination. However, the selected inclinations will depend on, among other things, the material particles to be separated, and the results desired, such for example as the desired character or quality of the separation and the quantity rate of separation, and hence I do not limit myself to the inclinations given.

Desirably the longitudinal angle of inclination is greater than the angle of repose of the material fed to the table, but the angle may be equal to or less than the angle of repose of the material. If the angle of inclination is such that the material fed to the table will not, by itself, slide downwardly in the grooves 65 then the table may be vibrated. To this particular end the vibration may be any sort of vibration which will prevent the friction of rest from keeping the particles from sliding downwardly. However, in general, and even if the longitudinal angle of inclination is greater than the angle of repose, the table desirably is vibrated, since suitable vibration causes the particles of material in a groove to be milled about in the groove, thereby bringing particles from underneath to the surface so that they may freely rise into the electrostatic field between the upper and lower electrodes.

Figures 3, 4, and 5 illustrate one way in which the table may be vibrated. A bracket 85 is provided for carrying an electric motor 86 having an eccentric weight or disc 87 mounted on its shaft. The bracket 85 comprises a plate 88 which bears against the under side of the table frame 30a, in this instance at the braced end of the channel bar 47. The plate 88 is pivotally mounted by means of a bolt and nut 89, and has two 90° arcuate slots 90, diametrically opposite each other, through which are disposed the shanks of cap screws 91 in threaded engagement with, in this instance, the brace plates 48, 49. The bracket 85 further comprises a depending plate 92 extending at right angles from and suitably rigidly fastened to the left hand margin of the plate 88 as viewed in Figure 4. The feet (not visible) of the motor 86 are screwed to a plate 93, here shown as circular (see Figure 5), which is pivotally mounted by a bolt and nut 94 on the depending plate 92; and the circular plate is provided with two 90° arcuate slots 95, diametrically opposite each other, through which are disposed the shanks of cap screws 96 engaging threaded holes in the depending plate 92. It will be evident that by reason of the adjustability of the bracket 85 about the axis of the bolt 89 and the adjustability of the plate 93 about the axis of the bolt 94, the direction of the shaft of the motor 86 is universally adjustable with respect to the plane of the table 30. In the position of the parts shown in Figures 4 and 5, the shaft of the motor 86 is in a plane transverse to the table 30, the plane being at right angles to the table, but in that plane the shaft extends at an angle other than 90° to the plane of the table.

To understand the action of the vibrating means, let it be first assumed that the shaft of the motor 86 is perpendicular to the plane of the table 30. It will be apparent that rotation of the disc 87 in a plane parallel to the table will cause maximum transverse and maximum longitudinal vibrating movement of the table, but substantially no up and down movement perpendicular to the plane of the table. If the motor 86 is so adjusted that the plane of rotation of the disc 87 extends perpendicularly to and longitudinally of the table, the disc will cause maximum longitudinal vibratory movement as before, but, instead of transverse vibratory movement in the plane of the table, the table will be caused to vibrate up and down to a maximum extent. If the motor 86 is so adjusted that the plane of the disc 87 is perpendicular to and transverse to the table 30, the table will be given the maximum up and down vibratory movement and the maximum transverse vibratory movement, without longitudinal vibratory movement. From the foregoing it will be apparent that by suitable adjustment of the motor 86 the table 30 may be given any desired combination of vibratory movements.

One suitable adjustment is shown in Figure 5. It will be apparent that if the disc 87 is in a position such as in Figure 5, the table will be given the maximum longitudinal vibratory movement, and somewhat less than the maximum transverse vibratory movement, and a desired slight up and down vibratory movement.

The means 32 for feeding the material particles onto the table may be seen in detail in Figures 6 through 10, and this means includes a tube 100 disposed transversely of the upper end of the table above the plane of the lower electrode 31, the tube 100 being provided with discharge aperture means here shown as comprising a series of uniformly longitudinally closely spaced apertures 101 slightly elongated in a circumferential direction. The series of apertures 101 extends from near the upper end of the upper transverse end margin of the lower electrode 31 to almost the lower end of that margin. The tube 100 is disposed in tubular end bearings 102, 103 which in turn are supported by brackets 104, 105, ends of which are welded or otherwise suitably fastened thereto, the other ends of the brackets being fastened, as by cap screws 106 to the respective side angle bars 51, 52 of the frame 30a. Normally the tube 100 is held from rotative movement in the bearings 102, 103 by means of a set screw 107 extending into the bearing 102. Expansion and contraction of the tube 100 due to temperature changes is permitted because the lower end of the tube fits slidably in the bearing 103.

The upper end of the tube 100 is the inlet end, and this may be connected by means of a conduit 108 desirably including a flexible portion, to a hopper (not shown) containing the particles to be separated. Valve means, here shown as comprising a slidable gate 109, may be interposed between the conduit 108 and the inlet end of the tube 100 for adjusting the rate at which particles may flow into the tube.

Disposed in the tube 100 is a piston 110 suitably fastened to a piston rod 111 guided in a bearing member 112 fastened by cap screws 113 to the bracket 105. The piston 110 includes a ring of any suitable somewhat resilient material so constructed and arranged that the ring fits snugly but slidably in and against the inner wall of the tube 100. By moving the piston rod 111 longitudinally, as by a knob 125, the piston 110 may be adjusted in the tube 100 in a range from below the lower end of the series of apertures 101 to above the upper end of the series, so that either all of the series, or no part of the series, or any desired length of the series may be exposed, the particles being of course discharged only through the exposed part of the series of apertures.

The feeding means 32 as thus far described is operative to feed particles to the lower electrode 31, but in order that the thickness of the stream of particles discharged from the series of apertures 101 may be adjusted, an outer tube 114 fitting rotatably about the tube 100 is provided, the outer tube 114 having a series of apertures 115 (see Figure 9) the same as and fully registrable with the series of apertures 101 in the inner tube 100. In the position of the parts shown in Figures 6 through 10, the two series of apertures 101, 115 are in complete registry. By turning the outer tube 114 about the inner tube 100 the series of apertures 101, 115 in the respective tubes 100, 114 may be brought out of registry any desired amount, so that the stream of material may be adjusted to any desired thickness from maximum to minimum. For the purpose of turning the outer tube 114 a clamp 116 nearly encircling the tube 114 may be provided, this clamp having fastened thereto, as by a cap screw 117, a crank 118 to which is pivoted a rod 119 in this instance extending under the table frame 30a and guided by a bearing 120 fastened to the channel 54a (see Figure 3). The rod 119 has an operating knob 121 and carries a pointer 122 cooperable with a scale 123 for indicating the rotative position of the tube 114. The rod 119 may be held in adjusted position by a set screw 124 in the bearing member 120.

It will be evident that the feeding means 32 is so constructed and arranged that the particles are fed to the lower electrode 31 in a stream defining a plane, in effect a sheet or curtain, and that the width of the stream may be gradually adjusted to a desired width by operation of the knob 125 for moving the piston 110, and the thickness of the stream may be gradually adjusted to a desired thickness by operation of the knob 121 for rotating the outer tube 114.

If the material introduced into the inner tube 100 is heated the tube 100 will be heated by the material and it may increase in length more than the outer tube 114. To adjust for this inequality the outer tube 114 is adjustable longitudinally. To this end a pin 126 (see Figure 9) is provided which extends through diametrically opposite slots 127 in the outer tube 114 and through bearing holes 128 in the inner tube 100. The bearing surfaces for the pin 126 may be increased by lugs 129 through openings in which the pin 126 is disposed, the lugs 129 being welded to the inside wall of the tube 100. The pin 126 has a head 130 which abuts the outside of the outer tube 114, and the other end of the pin is reduced and threaded, and has a nut 131 thereon which is screwed against the shoulder formed by the reduced end. The pin 126 is thus freely rotatable but restrained against endwise movement. The pin 126 is formed, at the junction of the pin shank and head 130, to provide an eccentric cam 132, as best seen in Figure 10. The cam 132 has a diameter to fit in the slot 127 and has a thickness the same as the wall thickness of the tube 114. It will be evident that by rotation of the cam 132 the outer tube 114 may be moved longitudinally in either direction from the position shown in Figure 10. The cam 132 may be rotated in the desired direction by appropriate pull on a chain 133 cooperating with a wheel 134 mounted on a shaft 135 the end of which is screwed into the head 130. It will be evident that the pin 126 and cam 132 cooperate with the inner tube 100 and outer tube 114 to prevent longitudinal movement of the outer tube with respect to the inner tube except by rotation of the cam.

The slots 127 are made of sufficient length circumferentially so that the outer tube 114 may be adjusted rotatively as hereinbefore described. Such adjustment will not disturb a longitudinal adjustment of the outer tube 114 which has been effected by operation of the wheel 134, nor will such longitudinal adjustment disturb the rotative adjustment.

Baffle or guard means 136 is provided covering a zone of that portion of the lower electrode 31 which extends upwardly beyond the space immediately between the upper electrode 33 and the lower electrode 31 this baffle means comprising an elongated metal guard plate 137 bearing against the tops of the ribs 64 of the lower electrode and having a length at least that of the series of apertures 101 in the feeding means 32 so that the particles falling into the grooves 65 of the lower electrode continue downwardly in the grooves and underneath the plate 137. The baffle means 136 also comprises an upwardly extending guard flange 138 which bears against the outer surface of the outer tube 114 so that the particles cannot get onto the top of the plate 137 from the feeding means 32. The flange 138 may have a slot to accommodate the clamp 116. The plate 137 of the baffle means 136 is here shown as extending into the space immediately between the upper electrode 33 and the lower electrode 31. The baffle means 136 is held in position by leaf springs 139 bearing thereagainst, the springs 139 being mounted on a tube 140, the ends of which are fastened in any suitable way to the brackets 104, 105.

The space along the lower longitudinal margins of the upper and lower electrodes 33, 31, is enclosed by wall means 141 a portion of which is in the form of a trough 142 the bottom 143 of which is below the plane defined by the lower electrode 31 and which extends along the length of the lower electrode. The trough 142 may be best seen in cross-section in Figures 11 and 12 where it is shown as comprising a rail of wood 144 or other suitable material forming the higher side wall of the trough, the rail being nailed or otherwise suitably fastened to the side bar 57. The top of the rail 144 is flush with the plane defined by the upper surface of the slats 63. Suitably fastened to the lower margin of the rail 144 is one wall of an angle plate, in this instance of metal, which wall forms the bottom 143 of the trough 142, the other wall 145 of the angle plate extending upwardly and forming the lower side wall of the trough 142. The wall 145 extends upwardly, in this instance, to about the plane defined by the upper electrode 33. The trough 142 has an end wall 148 across its lower end.

Another portion of the wall means 141 is a plate 146, of suitable insulating material, as long as and overlapping the inside of the side wall 145. The upper margin of the plate 146 bears against the under side of the cross-boards 46 (a to e) and is suitably fastened to the cross-boards, in this instance, by being fastened to a side of a quarter round strip 147 the other side of the strip being fastened to the cross-boards 46 (a to e). Thus the plate 146 depends from the upper electrode supporting structure.

The wall means 141 further includes a plate or flap 149, of rubber or other suitable material, which is fastened at its upper end in any suitable way to the cross-board 46a (see Figure 18). The flap 149 hangs down from the cross-board 46a just inside of the end wall 148, so as to close the space left between the upper margin of the end wall 148 and the under side of the cross-board 46a.

Another portion of the wall means 141 comprises a plurality of openable covers 150 (a, b, c, and d) which may be seen in normal plan in Figure 2, one cover, 150a, being shown in the sectional view Figure 12. The cover 150a covers the rectangular opening defined between two consecutive cross-boards 46a, 46b, and between the plate 146 and the side bar 36. As here shown the cover 150a is made of sponge rubber which may have a reduced marginal portion 151 suitably fastened to the upper face of the strip 147, the cover 150a being wide enough to overlap the top of the side bar 36. The cover 150a may be provided with a reinforcing strip 152 of wood or other suitable material at its free margin, the weight of this strip also aiding in biasing the cover to closed or open position. A looped strap 153 or other suitable means for conveniently pulling open the cover 150a may be provided. It will be evident that when the cover 150 is pulled open, the sponge rubber flexes at and over the strip 147 and the weight of the reinforcing strip 152 will hold it in open position until it is again purposely closed. The other covers 150 (b, c, and d) are constructed and arranged similarly to the cover 150a.

It will be evident that while the space along the lower side margins of the upper and lower electrodes is enclosed by wall means 141 as hereinbefore described, any selected one, or more, of the covers 150 (a, b, c, and d) may be opened for purposes of inspection.

The trough 142 is provided with gate means comprising in this instance three pivoted gates 154 (a, b, and c) whereby the trough may be left undivided (by opening all of the gates) or may be divided into a desired number of sections (by closing one or more of the gates). One of these gates, 154a, may be seen most clearly in Figures 12, 15, and 17 and a description of this gate will serve for all. The gate 154a comprises a shaft 155 fitting rotatably in an opening in the wall 145 of the trough 142 and in a recess in the top of the rail 144, a plate 156 being fastened to the top of the rail 144 to hold the shaft 155 in the recess. The outer end of the shaft 155 carries an enlargement 157 provided with a transversely extending pin 158 whereby the shaft may be turned. The gate proper is made of a plate 159 of sponge rubber or other suitable material, clamped to the shaft 155 by a sheet metal U-shaped clamp 160, bolts and nuts 161 holding the sponge rubber plate between the arms of the clamp and bolts and nuts 162 fastening the bight of the clamp to the shaft 155. The sponge rubber plate 159 desirably is somewhat larger than the inside of the trough 142 so that it will fit the inside walls of the trough tightly and will not move unless purposely moved by operating the pin 158. In the drawings the gate 154a is shown in closed position whereas the gates 154b and 154c are shown in open position.

The space within the wall means 141 is divided by, in this instance, three transverse dividing plates, two of which 165a and 165b are visible in the drawings. These dividing plates depend from the upper electrode supporting structure underneath the three central cross-boards 46 (b, c, and d) as will appear. A description of one of these dividing plates, 165a, will serve for all. Referring particularly to Figures 12, 15, 16, and 17, the plate 165a, of suitable insulating material, is of inverted L-shape (Figure 12) the end of the foot of the L being of the same width as and abutting the side bar 36, and being suitably fastened to a block 166 (Figures 15 and 16) in turn suitably fastened to the side bar 36. The right hand margin of the plate 165a, as viewed in Figure 12, abuts the depending wall 146, and, as best seen in Figure 16, is fastened to one face of a quarter round strip 167, the other face of the strip 167 being fastened to the inside of the wall 146. As may be seen in Figure 15, the lower end of the plate 165a extends into the trough 142 but not to the bottom 143 of the trough. The left hand margin 168 of the leg of the L-shaped plate 165a may be beveled, and this margin slidably engages the wall of the trough formed by the rail 144. The slight space left between that part of the right hand margin of the plate 165a which extends below the lower margin of the depending wall 146 and into the trough 142 may be packed by a packing strip 169, as of sponge rubber, held between the plate 165a and the strip 167, as shown in Figure 17.

The gate 154a and the dividing plate 165a are spaced only a short distance and between them the bottom 143 of the trough is provided with a discharge opening 170a connected to a spout 171a here shown as having connected thereto a flexible conduit 172 leading into a receptacle 210.

The bottom 143 of the trough also has discharge openings 170b, 170c to which spouts 171b, 171c are respectively connected, and the other two dividing plates corresponding to the dividing plate 165a are related to the respective openings 170b, 170c and the respective gates 154b, 154c the same as is the dividing plate 165a to the opening 170a and to the gate 154a.

Adjacent the end wall 148, the bottom 143 of the trough has one or more discharge openings 211 connected to nipples 212 (see Figure 18) and these nipples may have conduits connected thereto leading to a receptacle 213 indicated in Figure 1.

In the setting shown in the drawings, the gates 154b and 154c being open, the spouts 171b, 171c are closed by stoppers 173. However, when any gate is closed the immediately adjacent spout will have the stopper removed and will be connected to a separate receptacle.

The space along the lower transverse margins of the lower and upper electrodes 31, 33 is enclosed by wall means 175 a portion of which is in the form of a trough 174 of wood or other suitable material, the bottom wall 176 of which is below the plane defined by the lower electrode 31, and which extends along the lower transverse margin of the lower electrode. A side wall 177 of the trough, as may be seen in Figure 19, laterally abuts and is suitably fastened to the end bar 59 of the lower electrode supporting frame. The lower end of the lower electrode 31 terminates in a transverse end margin 207, the electrode extending downwardly a short distance over the top of the side wall 177 of the trough to the margin 207. The other side wall 178 of the trough extends upwardly from the bottom wall 176 to above the plane defined by the upper electrode 33, and, in this instance, almost to the plane defined by the upper side of the end bar 37 of the upper electrode supporting frame. The trough 174 is provided with end walls 179, 180 which extend upwardly from the bottom wall 176 to the plane defined by the upper surface of the side wall 178. The end walls 179, 180 clear the respective ends of the end bar 37 enough to permit free adjustment of the upper electrode 33.

Another portion of the wall means 175 comprises a plurality of openable covers, in this instance three in number, 181 (a, b, and c). These covers may be similar to the covers 150 (a, b, c, and d). The covers 181 (a, b, and c) may be seen in closed position in Figures 1, 2, and 18, and in open position in Figure 3. One of the covers, 181a, is seen in section in Figure 19. The covers 181 (a, b, and c) are fastened, as by screws 182, to the top of the side wall 178, and in closed position rest on the top margins of dividing plate means 183. The free ends 184 of the covers 181 (a, b, and c) are slightly flexed when the covers are closed, as may be seen best in Figure 19, since as here shown the free margins bear against the lower margin of the supporting frame for the upper electrode 33. Adjacent transverse margins 185 of the covers 181 (a, b, and c) are in contact when the covers are closed. Suitable weighting and reinforcing strips 186 and straps 187 are provided for each cover 181 (a, b, and c) similarly to the strips 152 and straps 153 of the covers 150 (a, b, c, and d).

The dividing means for the wall means 175 comprises a plurality of plates 183 of suitable insulating material. The plates 183 are parallel and define approximately vertical planes when the table is inclined transversely at an angle of approximately 35° to approximately 37° to the horizontal, so that for angles at which the apparatus is most often used the plates are approximately vertical.

The plates 183 may be held in position by being inserted in slots 188, 189 in the side walls 178, 177 respectively, and slots 190 in the bottom wall 176 of the trough 174. The free margins 191 of the plates are in a plane somewhat displaced to the right (as viewed in Figure 19) of the plane of the inside surface of the side wall 177. Each plate has a recess 192 freely accommodating the downwardly extending lower end marginal portion of the lower electrode 31.

In the bottom wall 176, near the junction of that wall and the side wall 178 (see Figure 19) are provided a plurality of discharge nipples 193, these nipples being disposed, as viewed in Figure 18, at the left side of the respective dividing plates 183, the lowermost nipple 193 being disposed adjacent the inside surface of the lower end wall 180 of the trough. To each nipple 193 may be connected a flexible conduit 194. Each flexible conduit 194 may, if desired, lead to a separate receptacle one of which, 195, is indicated in Figure 1. Thus, if desired, particles landing in any compartment defined by two adjacent dividing plates 183 may be segregated.

The space along the upper side margins of the lower and upper electrodes 31, 33 may be enclosed or at least partly enclosed, by a plate 196 (see Figure 11) of rubber or other suitable insulating material, fastened, as by screws 197, to the upper side bar 35 of the upper electrode supporting frame, the plate 196 bearing freely against the upper longitudinal margin of the lower electrode supporting frame 55. As here shown, the plate 196 extends from the lower end of the electrodes 31, 33 approximately half the length of the electrodes, the plate having a terminal margin 198 (see Figure 2), thus leaving open the space along the upper margins of the electrodes from the terminal margin 198 to the upper end of the upper side margins of the electrodes 31, 33.

The space along the upper end margin of the upper electrode 33 and the immediately adjacent surface of the baffle or guard plate 136 is shielded by a plate 199 of suitable insulating material fastened to the upper end bar 38 of the upper electrode supporting frame. The plate 199 extends downwardly to the guard plate 136 when the electrodes 31, 33 are at their minimum distance.

The space between the lower and upper electrodes 31, 33 may be ventilated by a stream or streams of heated air, to keep down the humidity of the air between the electrodes. I have found that air heated to a temperature of approximately 100° to 200° F. is suitable but obviously any suitable temperature may be used. To the foregoing end I may provide a motor-driven fan 200 which may be suitably carried by a bracket 201 fastened to the metal frame 30a of the table, the fan 200 having a heating element 202 disposed in its inlet opening, and having its discharge opening connected to a pipe or manifold 203 having connected thereto a plurality of nozzles 204. As may be seen in Figures 19 and 20 each nozzle 204 extends through a hole in the side wall 178 of the trough at a level above the plane defined by the lower electrode 31. Any given nozzle 204 discharges heated air into the space between two adjacent ones of the dividing plates 183, and may be held in place by a collar 205 around the nozzle which collar is forced against the side wall 178 by a nut 206 threaded onto the end of the nozzle. The velocity of the streams of air discharged by the nozzles 204 should be low so that the electrostatic separating action, hereinafter described, will not be interfered with by mechanical action of the air.

The operation of the apparatus is as follows. It may be assumed that the longitudinal and transverse angles of inclination of the apparatus have been adjusted to give the optimum separation and rate of separation of the particular material particles to be treated. The piston 110 is adjusted so that the desired length of the series of apertures 101 is exposed. This length may be such that ordinarily about one-third of the width of the lower electrode 31 will have material fed thereto, but the width of the feed may be as much as two-thirds or more of the width of the lower electrode. The width of the feed will depend upon a number of factors among which are the electrostatic susceptibilities of the particles of material and the rate and character of the separation found most satisfactory.

The particles introduced into the feeding means 32 should be dry, and they may be heated to a selected temperature before introduction into the feeding means, that temperature being selected which will result in the most efficient separation of the particles when passed through the apparatus herein disclosed.

The stream of material particles from the feeding means 32 falls onto the lower electrode 31 into the grooves 65 thereof and slides down in these grooves underneath the guard plate 137. The thickness of the stream of material from the feeding means 32 is desirably such that all of the material which drops into a given groove 65 will slide down in that groove and underneath the guard plate 137. If the thickness of the stream were greater, the material could not enter under the guard plate 137 fast enough and a part of the material would cascade transversely across the electrode 31 before sliding underneath the guard plate 137. However, a certain amount of such cascading is not objectionable, provided the material does not cascade so far as to result in an undesired width of feed.

When the particles slide out from under the lower margin of the guard plate 137 they come under the influence of the electrostatic field existing between the lower and upper electrodes 31, 33. The intensity of this field is so chosen that susceptible particles are lifted into suspension in the field. As soon as a susceptible particle is lifted from support by the lower electrode 31 its direction of movement is controlled by the electrostatic force acting on the particle upwardly perpendicularly with respect to the plane of the lower electrode 31 and by the force of gravity acting on the particle downwardly perpendicularly to a horizontal plane. The resultant of these forces is such that the particle floats or makes a flight, from its point of initial support, in a downward direction which is at an angle to the grooves 65. This direction has a component at right angles to the grooves 65 by reason of the transverse inclination of the electrodes 31, 33 and hence of the electrostatic field therebetween, and a component longitudinally of the grooves by reason of the longitudinal inclination of the electrodes and hence of the field therebetween, so that this direction is more or less diagonally downwardly across the grooves 65. A susceptible particle may make a flight in the electrostatic field long enough from its starting point to carry it into the trough 142. Or a particle may make a flight out of one groove 65 and land in a groove 65 which is of course lower than the groove from which the particle started, and the particle may then slide downwardly in that lower groove until it is again sufficiently charged to be lifted from the lower electrode and again make a downward flight in the field and across the grooves, and so on, until it finally lands in the trough 142, at a place in the trough lower than more susceptible particles. The more susceptible particles will not slide downwardly in a groove on the lower electrode 31 very far before they are again charged, and hence the more susceptible a particle is the sooner it will land in the trough 142. On the other hand, a particle may be susceptible but it will not land in the trough 142, because the flights it makes in the electrostatic field and the intermediate times it spends on the electrode 31 sliding downwardly are such that it finally falls from the lower end margin 207 of the lower electrode, from a lower groove 65 than the groove in which it started, into the trough 174, between two adjacent dividing plates 183. A particle which is not susceptible, or not susceptible enough to be lifted into the electrostatic field, will remain in that one of the grooves 65 in which it is disposed when is slides into the electrostatic field at the lower margin of the guard plate 137, and it continues to slide down in that groove until it falls from the lower end margin 207 of the lower electrode 31 into the trough 174, between two adjacent dividing plates 183.

From the foregoing it will be evident that the particles which land in the trough 142 comprise, generally speaking, the susceptible particles, the particles in the lower end of the trough including susceptible particles along with a percentage of non-susceptible particles accidentally carried in with the susceptible particles, and the particles which land in the upper end of the trough including the most susceptible particles and substantially no non-susceptible particles. The particles which land in the upper compartments of the end trough 174 comprise no or substantially no susceptible particles, and the particles which land in progressively lower compartments of the end trough will comprise an increasing percentage of susceptible particles. Thus the material fed to the apparatus may be segregated into a fraction containing no or substantially no susceptible particles, and a fraction containing all or substantially all susceptible particles, and between these extremes there is a middlings fraction containing both susceptible and non-susceptible particles in substantial percentage.

Obviously, if desired, the material discharged from each of the nipples 193 may be segregated, to obtain as many fractions as there are nipples, and, on the other hand, any selected number of the nipples 193, from the top down, may discharge into a common receptacle, and the lower, remaining nipples 193 may discharge into another common receptacle. Furthermore, in the set-up shown in the drawings, the particles from the nipples 212 are discharged into a separate receptacle, and the particles from the nipple 171a are discharged into a separate receptacle. In this set-up it is assumed that the fraction of particles landing in the trough 142 above the nipple 171a contains such a large percentage of susceptible particles that separation of this fraction would not be advantageous, but, if it would be advantageous, the gate 154b could be closed and the material discharged through the nipple 171a could also be segregated, or both gates 154b, and 154c could be closed and the material from both nipples 171b and 171c segregated.

In general, a selected fraction of the material between the selected most susceptible fraction and the selected least or non-susceptible fraction is a middlings fraction and may be subjected to further separating action in the apparatus.

If desired the selected middlings fraction may be discharged, from selected ones of the discharge nipples, onto a conveyer belt 214 which carries the middlings into the inlet spout 215 of an elevator 216. The elevator 216 may discharge the middlings into the hopper (not shown) for feeding the feeding means 32, and the middlings run through the apparatus along with previously untreated material, or, if desired the middlings fraction, or any selected fraction, may be run through the apparatus separately.

From the foregoing it will be apparent to those skilled in the art that the illustrated embodiment of my invention provides new and improved electrostatic separation of material particles, and accordingly, accomplishes the principal object of my invention. On the other hand, it also will be obvious to those skilled in the art that the illustrated embodiment of my invention may be variously changed and modified, or features thereof, singly or collectively, embodied in other combinations than that illustrated, without departing from the spirit of my invention, or sacrificing all of the advantages thereof, and that accordingly, the disclosure herein is illustrative only, and my invention is not limited thereto.

I claim:

1. Apparatus for electrostatic separation of material particles, comprising: means providing an electrostatic treating zone; means for feeding particles to said zone in a stream defining a general plane, comprising tubular means having an opening for receiving particles, and having longitudinally extending aperture means for discharging particles from said tubular means; and means, including an adjustable plunger disposed in said tubular means, so constructed and arranged that by adjustment of said plunger discharge of particles through any selected length of said aperture means is permitted.

2. Apparatus for electrostatic separation of material particles, comprising: means for mechanically supporting the particles to be separated comprising a transversely inclined table; means for feeding particles onto said table; means, including an electrode in spaced relation to said table, for subjecting the particles to the action of an electrostatic field; particle-receiving means comprising wall means enclosing the space along corresponding margins of said table and said electrode, a portion of said particle-receiving means comprising a trough the bottom of which is below the plane of the surface of said table; pivoted gate means, extending transversely across said trough, so constructed and arranged that by operation of said gate means said trough is undivided or is divided into a selected number of separate sections; and dividing plate means disposed within said wall means above the plane of the surface of said table and also extending downwardly into said trough leaving a space between the lower margin of said plate means and the bottom of said trough.

3. Apparatus for electrostatic separation of material particles, comprising: means for mechanically supporting the particles to be separated comprising a table having a plurality of collateral generally longitudinal ribs; said table being inclined both longitudinally and transversely; means for feeding particles onto said table at least at a higher portion of the higher end of said table; said supporting means being so constructed and arranged that particles while supported by said table tend to move downwardly along said ribs; and means, including an electrode spaced from said table, constructed and arranged to provide a substantially continuous electrostatic field over said table, said field being relatively stationary with respect to said table and inclined longitudinally of said table downwardly from said higher end and inclined transversely of said table downwardly from the upper longitudinal margin thereof so that susceptible particles in suspension in said field move downwardly across said field; said table being so constructed and arranged that particles moving across said field in approximately the direction in which said field extends downwardly at the greatest angle with respect to the horizontal are free to leave said table in said direction.

4. Apparatus for electrostatic separation of material particles, comprising: means for mechanically supporting the particles to be separated comprising a table having a plurality of collateral generally longitudinal ribs; said table being inclined both longitudinally and transversely; means for feeding particles onto said table at least at a higher portion of the higher end of said table; said supporting means being so constructed and arranged that particles while supported by said table tend to move downwardly along said ribs; and means, including an electrode spaced from said table, constructed and arranged to provide a substantially continuous electrostatic field over said table, said field being relatively stationary with respect to said table and inclined longitudinally of said table downwardly from said higher end and inclined transversely of said table downwardly from the upper longitudinal margin thereof so that at least the more susceptible particles progress over said table in a general direction diverging downwardly with respect to the general direction of progression of less susceptible particles; said table being so constructed and arranged that particles are free to leave said table at the places of intersection with the terminal margin of said table of the respective general directions of progression over said table.

5. Apparatus for electrostatic separation of material particles, comprising: means for mechanically supporting the particles to be separated comprising a table having a plurality of collateral ribs; said table being inclined transversely of said ribs and said ribs extending from an end of said table at a downward angle with respect to the horizontal; means for feeding particles onto said table at least at a higher portion of the higher end of said table; said supporting means being so constructed and arranged that particles while supported by said table tend to move downwardly along said ribs; and means, including an electrode of plate type spaced from said table and approximately collateral thereto, constructed and arranged to provide a substantially continuous electrostatic field over said table so that susceptible particles in suspension in said field move downwardly across said field; said table being so constructed and arranged that particles moving across said field in approximately the direction in which said field extends downwardly at the greatest angle with respect to the horizontal are free to leave said table in said direction.

6. Apparatus for electrostatic separation of material particles, comprising: means for mechanically supporting the particles to be separated comprising a table having a plurality of collateral generally longitudinal ribs; said table being inclined transversely of said ribs and said ribs extending from an end of said table at a downward angle with respect to the horizontal; means for feeding particles onto said table at least at a higher portion of the higher end of said table; said supporting means being so constructed and arranged that particles while supported by said table tend to move downwardly along said ribs; and means, including an electrode of plate type spaced from said table and approximately collateral thereto, constructed and arranged to provide a substantially continuous electrostatic field over said table so that at least the more susceptible particles progress over said table in a general direction diverging downwardly with respect to the general direction of progression of less susceptible particles; said table being so constructed and arranged that particles are free to leave said table at the places of intersection with the terminal margin of said table of the respective general directions of progression over said table.

7. Apparatus for electrostatic separation of material particles, comprising: means providing an electrostatic treating zone; and means for feeding particles to said zone in a stream defining a general plane, comprising inner tubular means having an opening for receiving heated particles, and outer tubular means fitting over said inner tubular means, said inner and outer tubular means each having longitudinally extending discharge aperture means constructed and arranged to be in desired degree of registry when said inner and outer tubular means are at the same temperature, said inner and outer tubular means being so constructed and arranged that they are relatively adjustable lengthwise to compensate for the higher temperature of said inner tube with respect to said outer tube.

8. Apparatus for electrostatic separation of material particles, comprising: means providing an electrostatic treating zone; and means for feeding particles to said zone in a stream defining a general plane, comprising inner tubular means having an opening for receiving particles, and outer tubular means fitting over said inner tubular means, said inner and outer tubular means each having longitudinally extending discharge aperture means, said inner and outer tubular means being so constructed and arranged that by relative rotative adjustment thereof said respective aperture means may be brought into the desired degree of registry thereby to adjust said stream to the desired thickness, and said inner and outer tubular means being so constructed and arranged that they are relatively adjustable lengthwise while leaving said rotative adjustment unchanged.

9. Apparatus for electrostatic separation of material particles, comprising: a pair of spaced electrodes for providing an electrostatic treating zone, a first of said electrodes having a plurality of collateral ribs and having a portion extending beyond the space immediately between said electrodes; means for feeding particles onto said extending portion; and baffle means, covering a zone of said portion between said feeding means and said space, so constructed and arranged that particles fed onto said extending portion are fed into said space from underneath said baffle means.

10. Apparatus for electrostatic separation of material particles, comprising: primary supporting means including a table for mechanically supporting the particles to be separated; means for feeding particles onto said table; auxiliary supporting means removably carried by said primary supporting means; means, including an electrode carried by said auxiliary supporting means in spaced relation to said table, for subjecting the particles to the action of an electrostatic field; particle-receiving means comprising a trough extending along a margin of said table and carried by said primary supporting means; and dividing plate means carried by said auxiliary supporting means and depending into said trough transversely thereof.

11. Apparatus for electrostatic separation of material particles, comprising: primary supporting means including a table for mechanically supporting the particles to be separated; means for feeding particles onto said table; auxiliary supporting means removably carried by said primary supporting means; means, including an electrode carried by said auxiliary supporting means in spaced relation to said table, for subjecting the particles to the action of an electrostatic field; particle-receiving means comprising a trough extending along a margin of said table and carried by said primary supporting means; and wall means, carried by said auxiliary supporting means, so constructed and arranged as to form an upward extension of the outermost wall of said trough.

12. Apparatus for electrostatic separation of material particles, comprising: primary supporting means including a table for mechanically supporting the particles to be separated; means for feeding particles onto said table; auxiliary supporting means removably carried by said primary supporting means; means, including an electrode carried by said auxiliary supporting means in spaced relation to said table, for subjecting the particles to the action of an electrostatic field; particle-receiving means comprising a trough extending along a margin of said table and carried by said primary supporting means; wall means, carried by said auxiliary supporting means, so constructed and arranged as to form an upward extension of the outermost wall of said trough; and dividing plate means carried by said auxiliary supporting means and depending into said trough transversely thereof.

13. Apparatus for electrostatic separation of material particles, comprising: supporting means including a table for mechanically supporting the particles to be separated; means for feeding particles onto said table; means, including an electrode in spaced relation to said table, for subjecting the particles to the action of an electrostatic field; particle-receiving means comprising a trough extending along a margin of said table; and pivoted gate means, extending transversely across said trough and pivoted on an axis transverse to the axis of said trough and in the general plane of said table, so constructed and arranged that by operation of said gate means said trough is undivided or is divided into a selected number of separate sections.

14. Apparatus for electrostatic separation of material particles, comprising: means for mechanically supporting the particles to be separated comprising an inclined table; means, including an electrode spaced from said table, for subjecting the particles to the action of an electrostatic fluid; and means for vibrating said table in three principal directions (1) transversely in its general plane (2) longitudinally in its general plane and (3) up and down with respect to its general plane; said vibrating means being so constructed and arranged that said table may be caused to vibrate in all three of said directions to a selected extent in each direction.

15. Apparatus for electrostatic separation of material particles, comprising: means for mechanically supporting the particles to be separated comprising an inclined table; means, including an electrode spaced from said table, for subjecting the particles to the action of an electrostatic fluid; and means for vibrating said table in three principal directions (1) transversely in its general plane (2) longitudinally in its general plane and (3) up and down with respect to its general plane; said vibrating means being so constructed and arranged that said table may be caused to vibrate in any two of said directions and approximately not at all in the third of said directions or may be caused to vibrate in all three of said directions to a selected extent in each direction.

16. Apparatus for electrostatic separation of material particles, comprising: means for mechanically supporting the particles to be separated comprising an inclined table; means, including an electrode spaced from said table, for subjecting the particles to the action of an electrostatic fluid; and means, including a motor having a rotor driving an eccentric weight and means for supporting said motor from said table, constructed and arranged to vibrate said table; said motor-supporting means being so constructed and arranged that the plane of rotation of said weight may be adjusted to three principal positions (1) parallel to the plane of the table (2) perpendicular to and longitudinally of the plane of the table or (3) perpendicular to and transverse to the plane of the table.

17. Apparatus for electrostatic separation of material particles, comprising: means providing an electrostatic treating zone; means for feeding particles to said zone in a stream defining a general plane, comprising inner tubular means having an opening for receiving particles, and outer tubular means fitting over said inner tubular means, said inner and outer tubular means each having longitudinally extending discharge aperture means, said inner and outer tubular means being so constructed and arranged that by relative rotative adjustment thereof said respective aperture means may be brought into the desired degree of registry thereby to adjust to the desired thickness the stream dischargeable from said aperture means; and means for effecting adjustment of the width of the stream dischargeable from said aperture means while leaving the adjustment for thickness of the stream unchanged.

18. Apparatus for electrostatic separation of material particles, comprising: electrode means including separate overlapping relatively shiftable particle-supporting members extending in a general plane; supporting means for said particle-supporting member; and holding means constructed and arranged resiliently to hold said particle-supporting members against said supporting means while permitting expansion and contraction of said particle-supporting members relatively to said supporting means.

19. Apparatus for electrostatic separation of material particles, comprising: electrode means including separate overlapping relatively shiftable particle-supporting members extending in a general plane; supporting means for said particle-supporting member; and holding means constructed and arranged resiliently to hold said particle-supporting members against said supporting means, said holding means comprising at least one stud projecting from the upper one of said particle-supporting members and extending through said supporting means, and means for resiliently biasing said stud in a direction away from said upper particle-supporting member to draw said particle-supporting members against said supporting means.

20. Apparatus for electrostatic separation of material particles, comprising: electrode means including separate overlapping relatively shiftable particle-supporting members extending in a general plane; supporting means for said particle-supporting members; said supporting means including a plurality of spaced collateral slats; and holding means constructed and arranged resiliently to hold said particle-supporting members against said supporting means, said holding means comprising a plurality of studs projecting from the upper one of said particle-supporting members and extending between adjacent slats, and means for resiliently biasing said studs in a direction away from said upper particle-supporting member to draw said particle-supporting members against said supporting means.

21. Apparatus for electrostatic separation of material particles, comprising: means for mechanically supporting the particles to be separated comprising an inclined table; means, including an electrode spaced from said table, for subjecting the particles to the action of an electrostatic field; and means, including a motor having a rotor and a rotatable shaft and including a rotatable eccentrically mounted weight driven by said shaft and including means for supporting said motor from said table, constructed and arranged to vibrate said table; said motor-supporting means being so constructed and arranged that the direction of the axis of the shaft of said motor with respect to the general plane of said table is adjustable while leaving the position of said table undisturbed.

EDWIN L. WIEGAND.